United States Patent [19]

Luciani

[11] Patent Number: 5,341,997

[45] Date of Patent: * Aug. 30, 1994

[54] TWO-WIRE STATOR WINDING MACHINE

[75] Inventor: Sabatino Luciani, Florence, Italy

[73] Assignee: Axis USA, Inc., Marlborough, Mass.

[*] Notice: The portion of the term of this patent subsequent to Mar. 16, 2010 has been disclaimed.

[21] Appl. No.: 994,336

[22] Filed: Dec. 21, 1992

Related U.S. Application Data

[63] Continuation of Ser. No. 626,196, Dec. 12, 1990, Pat. No. 5,193,755.

[51] Int. Cl.⁵ .............................................. B65H 81/06
[52] U.S. Cl. .............................. 242/1.1 R; 242/7.05 B
[58] Field of Search ............... 242/1.1 R, 7.05 B, 7.11; 29/596, 732, 736

[56] References Cited

U.S. PATENT DOCUMENTS

| | | | |
|---|---|---|---|
| 1,661,331 | 3/1928 | Gomory | 242/7.05 A |
| 3,383,058 | 5/1968 | Slayton | 242/1.1 |
| 3,412,947 | 11/1968 | Reichert et al. | 242/1.1 R |
| 3,686,735 | 8/1972 | Hill | 29/732 |
| 3,787,000 | 1/1974 | Farnsworth et al. | 242/1.1 R |
| 3,879,841 | 4/1975 | Mason | 242/1.1 R X |
| 3,881,238 | 5/1975 | Mason | 242/1.1 R X |
| 4,000,764 | 1/1977 | Reiger | 242/7.11 X |
| 4,027,827 | 6/1977 | Biddison | 29/596 X |
| 4,074,418 | 2/1978 | Pearsall | 29/596 |
| 4,428,113 | 1/1984 | Fischer et al. | 29/596 X |
| 4,951,379 | 8/1990 | Clemenz | 29/597 |
| 5,172,870 | 12/1992 | Van Assema | 242/7.05 BX |
| 5,193,755 | 3/1993 | Luciani | 242/1.1 R |

FOREIGN PATENT DOCUMENTS 387411 9/1990 European Pat. Off. .

OTHER PUBLICATIONS

European Patent Office, "Patent Abstracts of Japan", Abstract Publication Date Jul. 28, 1981, Abstract vol. 005117, Abstract of Publication No. JP56055025, Publication Date May 15, 1981.

European Patent Office, "Patent Abstracts of Japan", Abstract Publication Date Jun. 26, 1981, Abstract vol. 005099, Abstract of Publication No. JP 56041758, Publication Date Apr. 18, 1981.

European Patent Office, Japanese Patent Abstracts, vol. 11, No. 70 (E–485)(2517), Mar. 3, 1987, Abstract of Publication No. JP61227657 (1), Publication Date Oct. 9, 1986.

European Patent Office, "Patent Abstracts of Japan", Abstract Publication Date Jun. 2, 1981, Abstract vol. 005095, Abstract of Publication JP56038971, Publication Date Apr. 14, 1981.

*Primary Examiner*—Daniel P. Stodola
*Assistant Examiner*—Michael R. Mansen
*Attorney, Agent, or Firm*—Robert R. Jackson

[57] ABSTRACT

Methods and apparatus for winding the stator of an electric motor with two wires simultaneously are provided. The apparatus includes a stator winding needle having two separate wire delivery channels. The leads of the two wire to be wound are passed through the winding needle and are held by start lead holders. When winding is complete, the wires are identified by a lead pulling apparatus which rotates in a predetermined direction to grip an appropriate wire. The lead pulling apparatus draws each of the wires to a termination lead holder. Each wire is gripped and cut by a gripping assembly, which holds the cut leads in a predetermined position to facilitate winding of a subsequent stator.

32 Claims, 4 Drawing Sheets

TWO-WIRE STATOR WINDING MACHINE

This is a continuation of application Ser. No. 07/626,196, filed Dec. 12, 1990, now U.S. Pat. No. 5,193,755.

BACKGROUND OF THE INVENTION

This invention relates to a machine for winding coils of wire onto a stator of an electric motor. More particularly, this invention relates to a winding machine which winds a stator pole with two wires simultaneously.

It is often desirable to wind a stator pole with two wires. For example, two stator wires may be required to provide a means for controlling the speed of the armature of a motor during motor operation. However, if the stator wires are wound sequentially, production times are increased. Thus, it is desirable to wind the stator with two wires simultaneously. However, simultaneously winding the stator with two wires poses several technical problems.

If two wires are wound simultaneously, one wire may be pinched between the winding needle and the second wire, resulting in damage to the wire or insulation. This is particularly true if the wires are of different diameters. Also, the two wires may become twisted. Once the wires are wound, the leads of the appropriate wires must be identified for making the proper terminal connections. It is desirable to place the identified leads in a known position, to facilitate further automated processing of the stator.

SUMMARY OF THE INVENTION

It is an object of this invention to provide a stator winding machine which winds simultaneously two wire coils onto a stator pole of an electric motor, without damaging the wires or insulation.

It is also an object of this invention to provide a stator winding machine which identifies the respective leads of the two coils.

It is another object of this invention to provide a stator winding machine which places the leads of the wound coils in a known position, to facilitate further automated processing of the stator.

It is a further object of this invention to provide a stator winding machine which temporarily anchors the start and finish leads of a stator wound with two wires simultaneously.

A still further object of this invention is to provide a stator winding machine which forms an intermediate, continuous lead for the stator coils, and attaches the continuous lead to a terminal seat of the stator.

In accordance with this invention, there is provided a stator winding machine in which two wires are wound simultaneously onto a stator pole. The winding machine includes a winding needle which has two separate wire delivery channels. The separate delivery channels ensure that the wires and insulation are not damaged during winding. The wires exit the channels in distinct directions to facilitate processing by gripper and lead pulling assemblies.

An unwound stator is mounted in a housing having holders for gripping the start and finish leads of a wound stator. A gripping assembly delivers the start leads of the wires exiting the needle to the start lead holders, which hold the leads in predetermined positions. The needle then winds the stator pole with the two wires. When winding is complete, a lead pulling assembly grips a wire by rotating in a predetermined direction, and draws the wire past a finish lead holder. The finish lead holder secures the lead. The gripping assembly then grips the wire at a point beyond the finish lead holder, and cuts the wire. The lead pulling assembly grips the second wire by rotating in a second predetermined direction, and draws the second wire past a second finish lead holder. The gripping assembly then grips and cuts the second wire.

The wound stator, still mounted on the housing, may then be removed from the winding machine. The stator may be transferred to another apparatus for further processing. The gripper assembly is left holding, in a known position, the start leads of the next stator to be wound.

BRIEF DESCRIPTION OF THE DRAWINGS

The above and other objects and advantages of the invention will be apparent upon consideration of the following detailed description, taken in conjunction with the accompanying drawings, in which like reference numbers refer to like parts throughout, and in which.

DETAILED DESCRIPTION OF THE INVENTION

Figure 1:
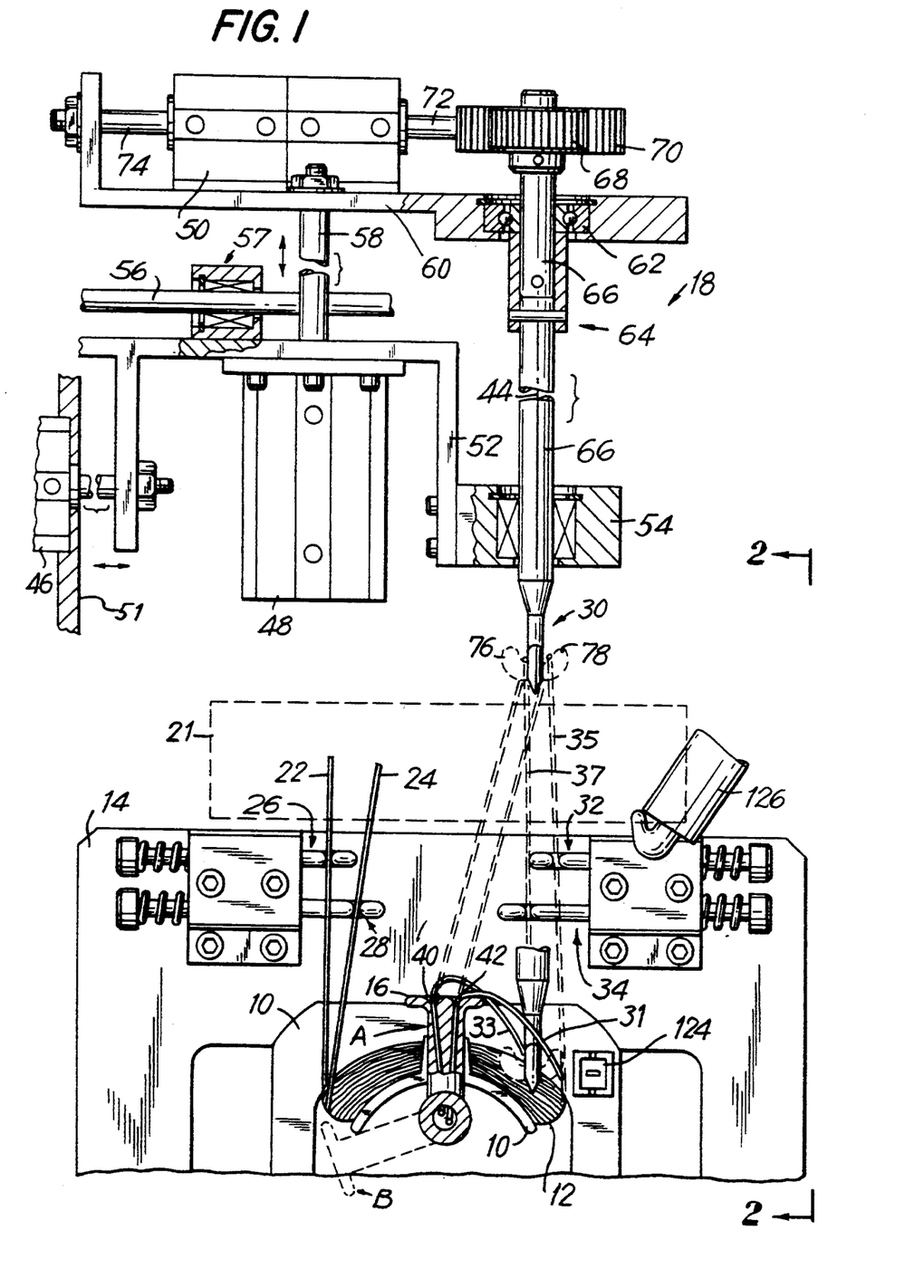
FIG. 1 is a partial, elevational view of a stator winding machine constructed in accordance with the principles of the present invention, showing the top of a wound stator.

Referring now to the drawings, the stator winding machine of the present invention winds a pole of a stator 10 with coils of wire 12. Stator 10 typically is mounted in a housing 14, which may remain attached to the stator after winding. The stator winding machine typically may include a winding needle 16, a lead-pulling assembly 18, and a gripping assembly 20 (shown in FIG. 2, the position of which is shown in FIG. 1 in phantom, indicated by reference number 21).

Each wire is fed through needle 16 from a continuous supply, such as a spool (not shown). To wind a pole of stator 10, leads 22 and 24 of the wires pass through needle 16 and are temporarily held by temporary terminating start lead holders 26 and 28, respectively. Needle 16 alternately reciprocates and oscillates around the stator pole, using a conventional winding motion (typically without shrouds), to form coils 12. When winding is completed, needle 16 stops at a position "A".

Figure 2:
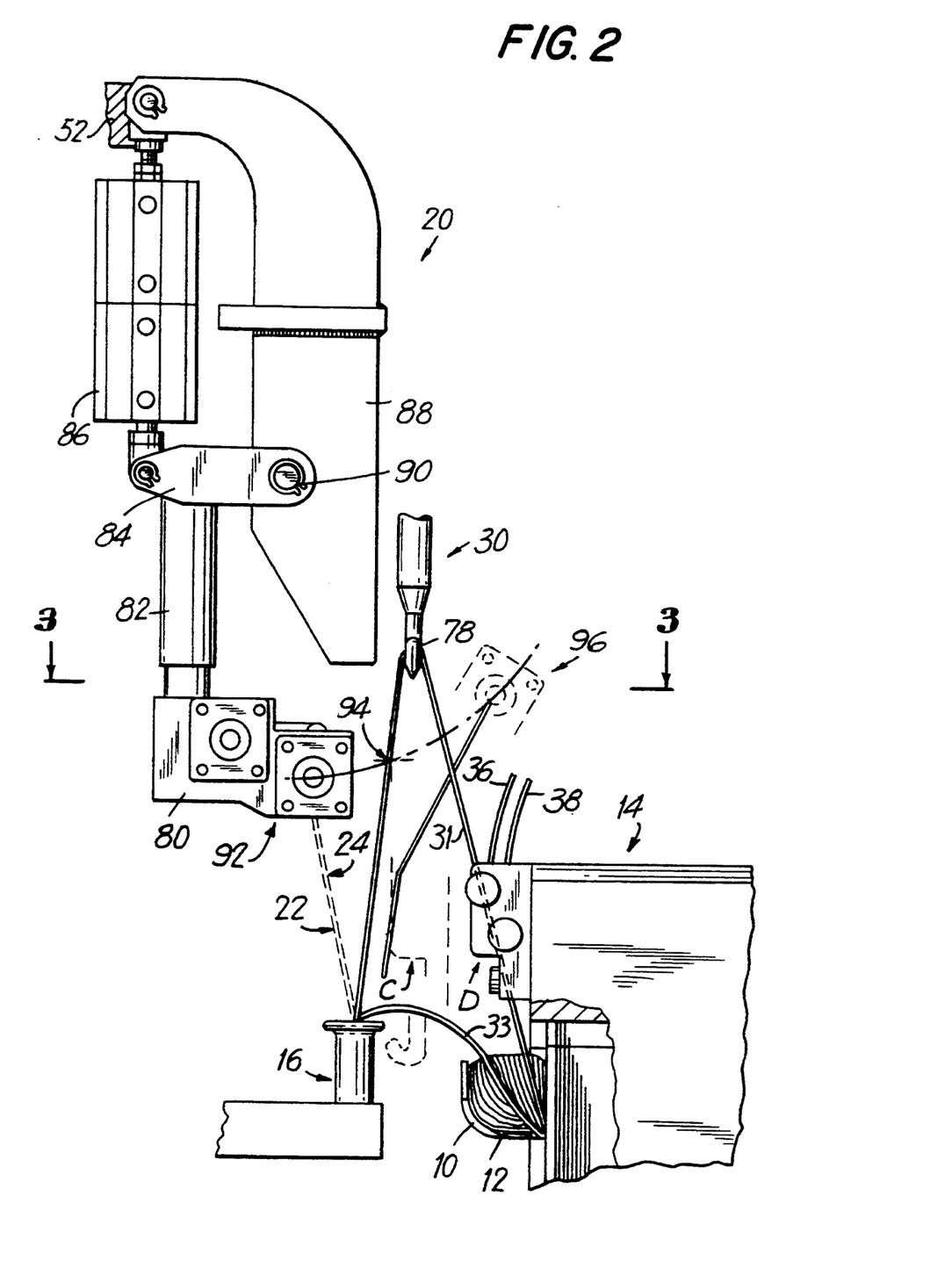
FIG. 2 is a side view of the machine of FIG. 1, taken along lines 2—2.

A lead pull 30 of assembly 18 then descends toward stator 10, passes between wires 31 and 33 extending from needle 16 to the stator pole, rotates to grip a wire 31, and retracts to pull wire 31 past a temporary terminating finish lead holder 32. (Wires 31 and 33 are shown extended past the temporary terminating holders as phantom wires 35 and 37, respectively.) Holder 32 grips and secures this first wire. Gripping assembly 20 then grips and cuts the first wire between needle 16 and lead pull 30 (as shown in FIG. 2 and described in greater detail below). The process is then repeated to secure the second wire 33 in temporary terminating finish lead holder 34. Gripping assembly 20, still gripping wire 31, grips and cuts wire 33 between needle 16 and lead pull 30. The portion of wires 31 and 33 gripped by gripping assembly 20 become the start leads of the next stator to be wound in the winding machine. Needle 16 moves to position "B" to align the start leads of wires 31 and 33 with holders 26 and 28 of the next stator to be wound.

Housing 14 preferably slides between the positions identified as "C" and "D" (FIG. 2). Housing 14 advances to position C so that gripping assembly 20 may bring start leads 22 and 24 in contact with start lead holders 26 and 28. The stator is wound with housing 14 in position C. The finish leads also may be attached to holders 32 and 34 when housing 14 is at position C. The housing preferably retracts to position D to clear needle 16, and to create a space for lead pull 30 to descend between needle 16 and stator 10.

Once the finish leads (indicated in their cut condition by reference numbers 36 and 38 in FIG. 2) are cut and secured in holders 32 and 34, housing 14 and stator 10 can be removed from the winding station. The start leads and finish leads (shown prior to cutting) of coils 12 are precisely positioned in start lead holders 26 and 28 and temporary terminating holders 32 and 34, respectively, to facilitate automated processing of the leads at a subsequent station in the assembly line.

In accordance with the principles of this invention, stator winding needle 16 is provided with two separate wire delivery channels 40 and 42, one for each wire. The separate delivery channels ensure that wires 31 and 33 exit needle 16 in predetermined, distinct directions when needle 16 is stopped to permit lead anchoring. Thus, a conventional winding machine can be adapted to wind two coils per pole, by passing wires 31 and 33 from their respective tensioners (not shown), through the main shaft of needle 16, and then threading the wires through the respective wire outlets of needle 16.

Lead pulling assembly 18 includes lead pull 30 (disposed along an axis 44), cylinders 46 and 48, and a double cylinder 50. Double cylinder 50 controls the rotation of lead pull 30 about axis 44. Lead pull 30 rotates about axis 44, in both clockwise and counter-clockwise directions, to grasp a predetermined one of wires 31 and 33, between needle 16 and stator 10. Cylinder 48 translates lead pull 30 along axis 44, toward stator 10, to grasp a wire. The lead pull is translated away from the stator to draw extra wire from needle 16, and to position wires 31 and 33 (also labeled 35 and 37, respectively) against temporary terminating holder 32 or 34 of housing 14. Cylinder 46 translates gripping assembly 20 and lead pull 30 across the face of stator 10, to align the gripping assembly and lead pull with holders 32 and 34 (for attaching the leads). Thus, wires 31 and 33 are placed adjacent to the gripping portion of holders 32 and 34 (which are opened by an actuator not shown).

An illustrative embodiment of lead pulling assembly 18 will now be described. One skilled in the art will appreciate that assembly 18 generally performs the functions of rotating lead pull 30, translating lead pull 30 along axis 44, and translating the lead pull across the face of stator 10. It will also be appreciated that these functions could be implemented using a variety of apparatus, only one of which is described below.

Cylinder 46 is coupled to the frame 51 of the winding machine. Frame 51 supports the entire lead pulling assembly. Cylinder 46 translates lead pull 30 perpendicular to axis 44, across the face of stator 10. The shaft of cylinder 46 is coupled to a slide 52, which supports lead pull 30 via support block 54. Slide 52 also supports cylinder 48. A coupling 57 of slide 52 slides on a guide 56 when the shaft of cylinder 46 extends or retracts.

Cylinder 48, mounted on slide 52, causes lead pull 30 to translate along axis 44. The shaft 58 of cylinder 48 is connected to a support member 60. Member 60 supports the outer ring of a bearing 62. The rotatable portion of bearing 62 is rigidly coupled to a cylindrical portion 66 of lead pull 30 via a pin and collar assembly 64. Extending shaft 58 causes lead pull 30 to translate upwards, away from the stator. Retracting shaft 58 translates lead pull 30 toward stator 10 for insertion between wires 31 and 33. The tip of lead pull 30 is preferably tapered to facilitate insertion between the two wires.

Cylindrical portion 66 of lead pull 30 is mounted to rotate on bearing 62. A gear 68 fixed to cylindrical portion 66 engages a rack 70, which is connected to a first output shaft 72 of double cylinder 50. A second shaft 74 of cylinder 50 is connected to support member 60. Actuating the shafts of cylinder 50 moves rack 70 forward or backward from a central position, causing lead pull 30 to rotate in a clockwise or counter-clockwise direction (as indicated by reference numbers 76 and 78, respectively).

Figure 3:
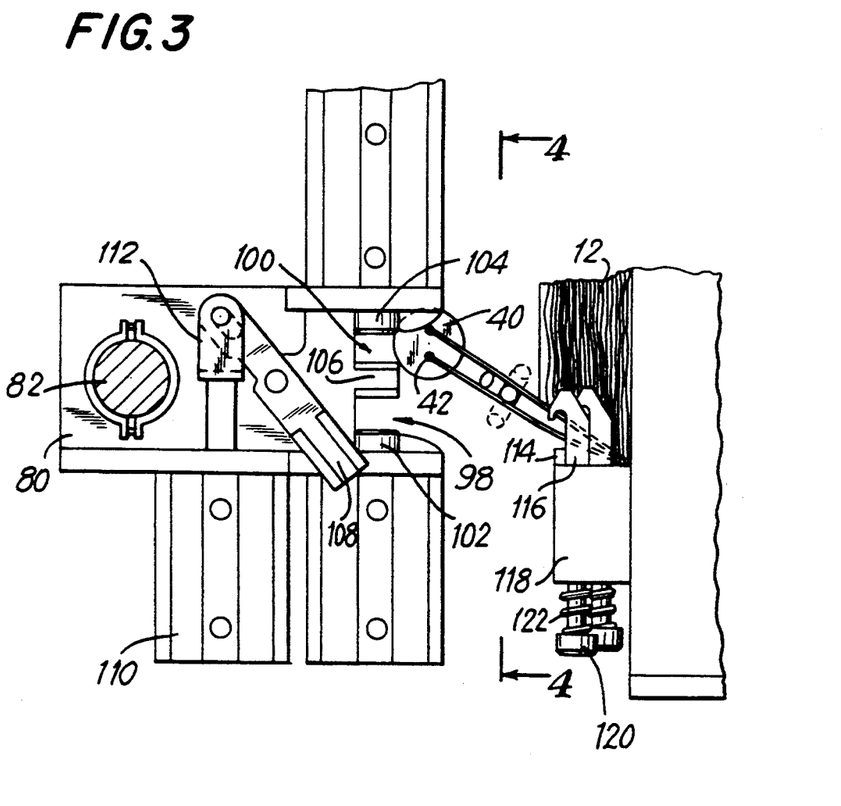
FIG. 3 is a top view of the machine of FIG. 2, taken along lines 3—3.
Figure 4:
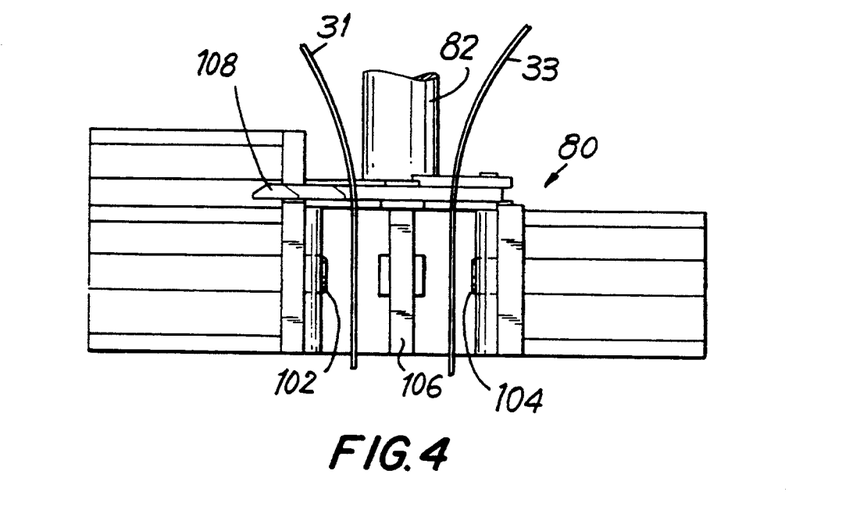
FIG. 4 is an elevational view of the machine of FIG. 3 taken along lines 4—4.

Referring now to FIGS. 2–4, gripper assembly 20 includes a gripper head 80 which is fixed to a post 82. Post 82 is rigidly connected to an arm 84, which is coupled between a double cylinder 86 and a support structure 88. Structure 88 preferably is mounted on slide 52 of lead pulling assembly 18 (FIG. 1), such that the gripper assembly can be translated by cylinder 46 to align start leads 22 and 24 with start lead holders 26 and 28.

Cylinder 86 rotates arm 84 about a pin 90 to move gripper head 80 in an arc between a rest position 92, an intermediate position 94, and an extended position 96. A first shaft extension of double cylinder 86 rotates gripper head 80 from position 92 to position 94, to grip and cut a wire between lead pull 30 and needle 16. A second extension of double cylinder 86 advances gripper head 80 to position 96, to insert initial leads 22 and 24 into holders 26 and 28.

Gripper head 80 includes two seats 98 and 100 for separately receiving and gripping wires 31 and 33. Once a lead has been inserted into its respective seat (by moving the gripper head to position 94), a cylinder plunger 102 or 104 of the respective seat is actuated to press the lead against a member 106, to grip the lead.

A cutter blade 108 cuts the portion of wire which stretches from the lead pull to the gripper head. A cylinder 110, coupled to cutter blade 108 by a pivoted lever 112, advances blade 108 across seats 98 and 100 to cut wires 31 and 33. Cutter blade 108 may be provided with two cutting edges, so as to cut when the piston of cylinder 110 extends or retracts.

Gripper head 80 then rotates back to position 92, holding a single wire extending from lead 16. This wire becomes a start lead 22 or 24 of the next stator to be wound. Lead pull 30 again translates along axis 44 toward the stator to grasp the remaining wire. Lead pull 30 rotates to grip the remaining wire, and retracts along axis 44. The second lead is gripped by the seat 98 or 100, and cut by blade 108. Gripper head 80 now holds two start leads from needle 16, and is ready to initiate the winding process on a successive stator to be positioned in the winding station.

When an unwound stator is positioned at the winding station, gripper head 80 translates across the stator face (by the action of cylinder 46 of FIG. 1) to align start leads 22 and 24 with start lead holders 26 and 28. Housing 14 is advanced to position C, as described above. Needle 16 may be rotated to position B (FIG. 1) to better align leads 22 and 24 with holders 26 and 28. Gripper head 80 is then rotated to position 96 to insert the leads into holders 26 and 28.

Referring to FIGS. 1 and 3, holders 26, 28, 32, and 34 typically may be operated by external actuators (not shown). Each holder includes a stationary member 114, a movable member 116 (shown "open" in FIG. 3) surrounded by a housing 118, an end member 120, and a spring 122. The external actuator acts on end member 120 to compress spring 122 to open the holder. When a lead has been placed against member 116, the actuator may release spring 122, capturing the lead. The action of spring 122 on housing 118 and end member 120 keeps the lead securely within the holder.

In an alternative embodiment of the invention, instead of temporarily anchored the wire coils on housing 14, the coils are temporarily anchored elsewhere (e.g., on the stator).

If desirable, an intermediate connection of the leads can be made to a terminal, such as terminal 124. A hook mechanism 126 may be provided to establish the intermediate connection. Hook mechanism 126 extends to capture one of wires 31 and 33, and then retracts to position the captured wire adjacent terminal 124. The intermediate connection may be formed for one or both of wires 31 and 33 according to the method described in commonly-owned, co-pending U.S. patent application Ser. No. 07/809,233, filed Dec. 17, 1991 as a continuation of now abandoned application Ser. No. 07/529,183, filed May 25, 1990, which is hereby incorporated by reference herein in its entirety. If one of wires 31 and 33 are not intermediately connected and inadvertently loosens, a wire tensioner associated with that wire may tighten the wire as necessary.

In another alternative embodiment, the coils are permanently terminated on the stator while the stator is still located in the winding station. In such instances, the terminals of stator 10 typically are positioned such that complicated manipulation is not required to mount the leads in the terminals (e.g., as shown in FIG. 5).

Figure 5:
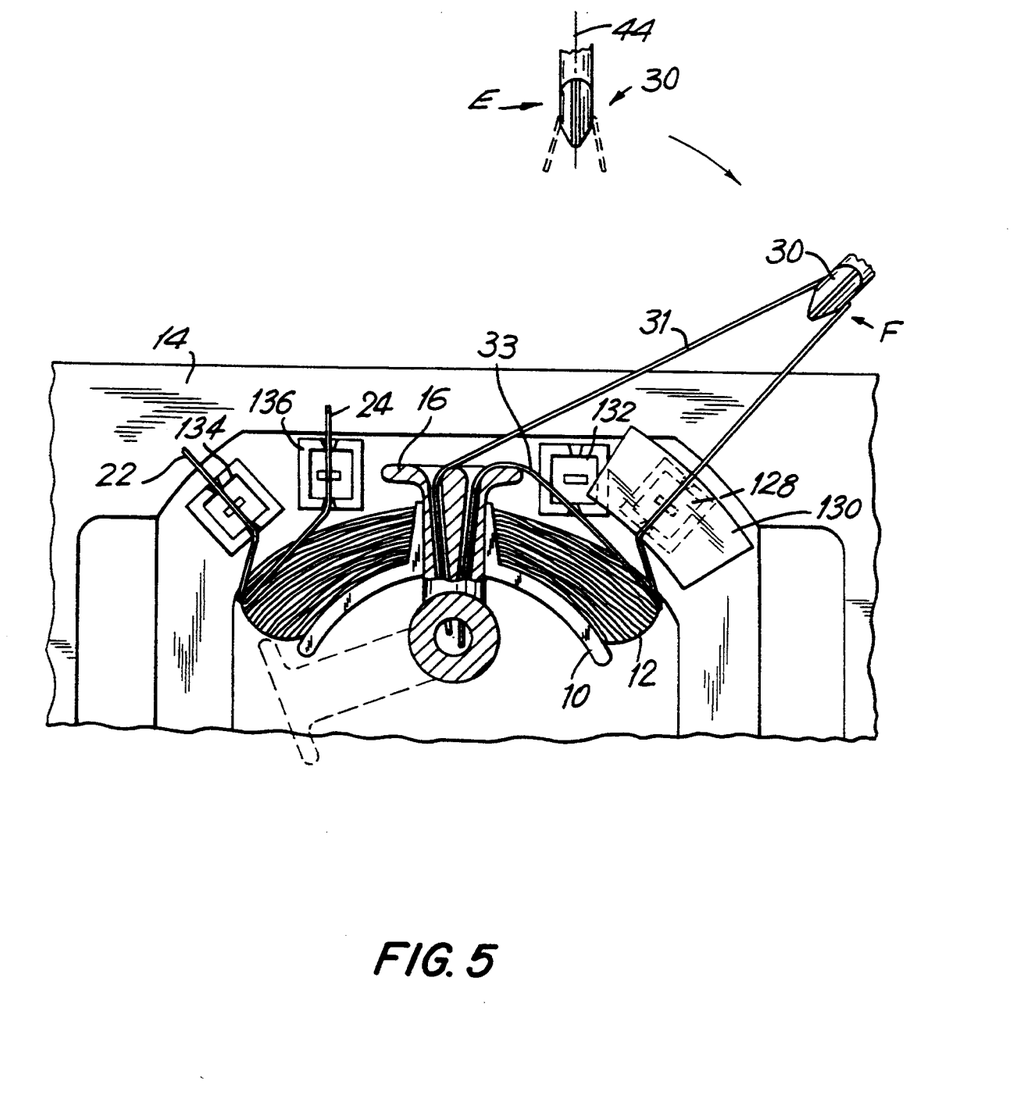
FIG. 5 is a partial elevational view of the stator of FIG. 1.

Referring to FIG. 5, lead pull 30 grasps wire 31, and then rotates from position "E" to position "F", to align axis 44 with a terminal receptacle 128 (shown in phantom). Prior to rotating lead pull 30, a wire guide 130 is positioned over terminal 128. When the lead pull moves across guide 130, wire 31 contacts the guide and passes along the surface of the guide until the wire is aligned with the terminal receptacle. Moving lead pull 30 toward housing 14 (or moving the housing toward the lead pull) brings the wire into the opening of the terminal receptacle. An inserting device (not shown) then drives wire 31 into the clamping portion of terminal 128. Gripper head 80 then grips and cuts the wire between terminal 128 and needle 16, forming an initial lead of the next stator to be wound. This process is repeated to terminate wire 33 in terminal 132.

To terminate the start leads of the next stator to be wound, gripper head 80 crosses the face of the next stator and inserts the initial leads into the initial lead terminal receptacles 134 and 136 (of the next unwound stator). The gripper head may place the initial leads into guides (not shown) positioned over terminals 134 and 136. The inserting device will then drive the initial leads into the clamping portions of receptacles 134 and 136.

A hook mechanism, such as hook mechanism 126, may be used to grip predetermined leads and align the leads with a wire guide when more complicated wire manipulation is required. An inserting device (not shown) will then drive the wire into a clamping portion of the terminal. Gripper head 80 grasps the terminated wire between the terminal and needle 16, and cuts the wire as previously described. To permanently attach the start lead to stator 10, hook mechanism 126 grips the wire between gripper head 80 and needle 16, and aligns the wire with a guide (not shown) positioned over the start lead terminal receptacle. The inserting device then inserts the start lead into the clamping portion of the terminal.

Thus a stator winding machine for winding a stator with two wires simultaneously is provided. One skilled in the art will appreciate that the present invention can be practiced by other than the described embodiments, which are presented here for purposes of illustration and not of limitation, and the present invention is limited only by the claims that follow.

What is claimed is:

1. Apparatus for winding a workpiece with a coil of wire made up of separate first and second wires wound on said workpiece simultaneously so that said first and second wires are intertwined with one another in said coil, said coil being wound around a structure on said workpiece which is formed between two substantially parallel, laterally spaced slots in said workpiece, said apparatus comprising:

a wire outlet structure for dispensing said first and second wires so that said first wire is dispensed along a first predetermined path and said second wire is dispensed along a second predetermined path, both of said first and second paths leading to the same slot at substantially the same time so that both of said first and second wires are deposited in the same slot at substantially the same time;

wire holding means for holding said first and second wires adjacent said workpiece; and a lead pull assembly for engaging said first and second dispensed wires adjacent a first side of said workpiece and for enabling said wire holding means to hold said first and second wires, wherein said lead pull assembly includes a lead pull member adapted to be oriented in (1) a first position for engaging said first dispensed wire along said first predetermined path and (2) a second position different from said first position for engaging said second dispensed wire along said second predetermined path.

2. The apparatus of claim 1 wherein said lead pull member comprises a shaft member having a hook at one end for engaging said first and second dispensed wires.

3. The apparatus of claim 2 wherein said lead pull assembly comprises:

means for rotating said shaft member to orient said lead pull member; and means for translating said shaft member to enable said wire holding means to hold said first and second wires.

4. The apparatus of claim 3 wherein said means for rotating said shaft member rotates in a first direction to engage said first wire, and rotates in a second direction to engage said second wire.

5. The apparatus of claim 4 wherein said wire holding means comprises a first wire holding means for holding said first wire and a second wire holding means for holding said second wire.

6. The apparatus of claim 5 further comprising:
means for selectively gripping and cutting said first wire after said first wire is held by said first wire holding means and for selectively gripping and cutting said second wire after said second wire is held by said second wire holding means.

7. The apparatus of claim 6 wherein said first wire holding means and said second wire holding means each comprise a means for holding a start lead and a finish lead.

8. A method for winding a workpiece with a coil of wire made up of separate first and second wires wound on the workpiece simultaneously, said coil being wound around a structure on said workpiece which is formed between two substantially parallel, laterally spaced slots in said workpiece, said method comprising the steps of:
dispensing said first and second wires from a wire outlet structure so that said first wire is dispensed along a first predetermined path and said second wire is dispensed along a second predetermined path, both of said first and second paths leading to the same slot at substantially the same time so that both of said first and second wires are deposited in the same slot at substantially the same time;
winding said workpiece with said first and second dispensed wires;
orienting a lead pull member in a first position for engaging said first dispensed wire adjacent a first side of said workpiece and along said first predetermined path;
engaging said first dispensed wire with said oriented lead pull member so as to enable a first holding means to hold said first wire adjacent said workpiece;
re-orienting the lead pull member in a second position different from said first position for engaging said second dispensed wire adjacent said first side of said workpiece along said second predetermined path; and
engaging said second dispensed wire with said re-oriented lead pull member so as to enable a second holding means to hold said second wire adjacent said workpiece.

9. The method of claim 8 wherein said lead pull member comprises a shaft member having a hook at one end for engaging said first and second wires, wherein said steps of orienting and re-orienting said lead pull member comprise the step of rotating said shaft member, and wherein said steps of engaging said first and second wires comprise translating said shaft member to enable said first and second wire holding means to hold said first and second wires, respectively.

10. The method of claim 9 wherein said step of orienting said shaft member comprises rotating said shaft member in a first direction and wherein said step of re-orienting said shaft member comprises rotating said shaft member in a second direction different from said first direction.

11. The method of claim 10 further comprising the steps of:
selectively gripping and cutting said first wire after said first wire is held by said first wire holding means; and
selectively gripping and cutting said second wire after said second wire is held by said second wire holding means.

12. The method of claim 11 wherein said first wire holding means and said second wire holding means each comprise a means for holding a start lead and a finish lead.

13. Apparatus for winding a workpiece with two wires simultaneously, said wires being wound around a structure on said workpiece which is formed between two substantially parallel, laterally spaced slots in said workpiece, comprising:
a needle for simultaneously winding the workpiece with a first and a second wire, said needle having a separate delivery channel for each of the first and second wires wherein said channels are laterally spaced from one another by a sufficient amount so that said first and second wires are laterally spaced from each other along any part of their length extending from said needle to said workpiece, both of said wires being deposited in the same one of said slots at substantially the same time;
first holding means for holding said first wire adjacent said workpiece;
second holding means for holding said second wire adjacent said workpiece;
a lead pull member for passing the first wire adjacent to the first holding means and for passing the second wire adjacent to the second holding means wherein said wires are captured adjacent a first side of said workpiece and along said laterally spaced part of their length;
means for gripping the first wire after it has passed adjacent to its respective holding means and for gripping the second wire after it has passed adjacent to its respective holding means; and
means for cutting the first and second gripped wires, wherein said lead pull member comprises:
a shaft member having a hook at one end for capturing wire;
and wherein said apparatus further comprises:
means for rotating said shaft member to selectively capture either the first or second wire in said hook; and
means for translating said shaft member to pass the selectively-captured wire adjacent to its respective holding means.

14. The apparatus of claim 13 wherein:
said gripping means is disposed to grip the first and second wires at points between the points at which said lead pull member and said needle contact the first and second wires; and
said cutting means is positioned to cut the first and second wires between said lead pull member and said gripping means.

15. The apparatus of claim 13 wherein said means for rotating said shaft rotates in a first direction to capture the first wire, and rotates in a second direction to capture the second wire.

16. The apparatus of claim 13 wherein said gripping means comprises:
means for releasably grasping at least one of the first and second wires; and
means for inserting a grasped wire into a means for holding a wire.

17. The apparatus of claim 13, further comprising means for mounting the workpiece in a position to receive the first and second wires, said first and second holding means being positioned on said mounting means.

18. The apparatus of claim 17 wherein said first and second holding means comprises means for holding a start lead and a finish lead of each of the first and second wires, respectively.

19. The apparatus of claim 18 wherein said gripping means comprises:
   means for releasably grasping at least one of the first and second wires; and
   means for inserting a grasped wire into its respective means for holding wire.

20. Apparatus for winding a workpiece with two wires simultaneously, comprising:
   a needle for simultaneously winding the workpiece with a first and second wire, said needle having a separate delivery channel for each of the first and second wire wherein said channels are laterally spaced from one another by a sufficient amount so that said first and second wires are laterally spaced from each other along part of their length extending from said needle to said workpiece;
   first holding means for holding said first wire adjacent said workpiece;
   second holding means for holding said second wire adjacent said workpiece;
   a lead pull assembly for capturing said first and second wires adjacent a first side of said workpiece and along said laterally spaced part of their length, comprising:
      a shaft member having a hook at one end for capturing wire;
      means for rotating said shaft member to selectively capture either the first or second wire in said hook; and
      means for translating said shaft member to pass the selectively-captured wire adjacent to its respective holding means; and
      means for cutting the selectively-captured wire.

21. The apparatus of claim 20, further comprising:
   means for gripping the selectively-captured wire after it is passed adjacent to its respective holding means, said gripping means being disposed to grip the first and second wire at a point between the points at which said holding means and said needle contact the first and second wires.

22. The apparatus of claim 21, further comprising means for mounting the workpiece in a position to receive the first and second wires, said first and second holding means being positioned on said mounting means.

23. Apparatus for simultaneously winding two wires on a pole of a stator, said stator being a hollow annulus with said pole projecting radially into the hollow interior of said stator, said pole being provided between two substantially parallel, laterally spaced slots in the stator, comprising:
   wire dispensing means mounted adjacent a first axial end of said stator and being extendable from said first axial end through said hollow interior of said stator to a second axial end of said stator remote from said first axial end, said wire dispensing means having adjacent first and second wire dispensing outlets, wherein said first outlet dispenses a first wire and said second outlet dispenses a second wire, both of said wires entering said wire dispensing means adjacent said first axial end of said stator, and said outlets being laterally spaced from one another by a sufficient amount so that said first and second wires are laterally spaced from each other along part of their length extending from said wire dispensing means to said stator where both of said wires enter the same slot at substantially the same time;
   means for moving said wire dispensing means relative to said stator in order to cause said first and second wires to be pulled from their respective outlets and to be wound around said pole with both of said wires entering the same slot at substantially the same time;
   a lead pull assembly having a lead pull member;
   a first lead holder member associated with said stator; and
   means for orienting said lead pull member adjacent the first and second wires along said laterally spaced part of their length extending from said wire dispensing means to said pole when the desired number of windings have been wound on said pole and for moving said lead pull member to engage the first wire and position said first wire so that it can be held by said first lead holder member in such a way that said first wire remains spaced from said second wire adjacent said first lead holder.

24. The apparatus defined in claim 23 further comprising:
   first means for gripping said first wire between said first lead holder member and said first wire dispensing outlet; and
   means for cutting said first wire between said first means for gripping and said first lead holder member.

25. The apparatus defined in claim 24 further comprising:
   a second lead holder member associated with said stator; and
   means for moving said lead pull member to engage the second wire after said first wire has been cut and to position said second wire so that it can be held by said second lead holder member.

26. The apparatus defined in claim 25 further comprising:
   second means for gripping said second wire between said second lead holder member and said wire dispensing means; and
   means for cutting said second wire between said second means for gripping and said second lead holder member.

27. The apparatus defined in claim 26 further comprising:
   third and fourth lead holder members associated with a next stator to be wound; and
   means for positioning said first and second wires respectively extending from said first and second wire dispensing outlets to said first and second means for gripping so that said first and second wires can be respectively held by said third and fourth lead holder members.

28. A method of simultaneously winding two wires on a pole of a stator, said stator being a hollow annulus with said pole projecting radially into the hollow interior of said stator, said pole being provided between two substantially parallel, laterally spaced slots in the stator, comprising the steps of:
   moving a wire dispenser having adjacent first and second wire dispensing outlets, wherein said first outlet dispenses a first wire and said second outlet dispenses a second wire, relative to said stator in order to cause said first and second wires to be pulled from said outlets so that said first and second wires are laterally spaced from each other along part of their length extending from said outlets and to be wound around said pole with both of said wires entering the same slot at substantially the same time, both of said wires entering said wire dispenser adjacent a first axial end of said stator;

orienting a lead pull member of a lead pull assembly adjacent the first and second wires along said laterally spaced part of their length extending from said wire dispensing outlets when the desired number of windings have been wound on said pole; and moving said lead pull member so that it engages the first wire and positions said first wire so that it can be held by a first lead holder member associated with said stator said first wire being held by said first lead holder member in such a way that said first wire remains spaced from said second wire adjacent said first lead holder.

29. The method defined in claim 28 further comprising the steps of:

gripping said first wire between said first lead holder member and said first wire dispensing outlet; and cutting said first wire between said first lead holder member and the point of which said first wire is gripped in said gripping step.

30. The method defined in claim 29 further comprising the step of:

moving said lead pull member to engage the second wire after said first wire has been cut and to position said second wire so that it can be held by a second lead holder member.

31. The method defined in claim 30 further comprising the steps of:

gripping said second wire between said second lead holder member and said second wire dispensing outlet; and cutting said second wire between said second lead holder member and the point at which said second wire is gripped in said second wire gripping step.

32. The method defined in claim 31 further comprising the steps of:

positioning said first and second wires respectively extending from said first and second wire dispensing outlets to the points at which said first and second wires are gripped in said first and second wire gripping steps so that said first and second wires can be respectively held by third and fourth lead holder members associated with a next stator to be wound.

* * * * *